United States Patent
Stark

(10) Patent No.: US 9,656,333 B2
(45) Date of Patent: May 23, 2017

(54) CUTTING INSERT AND TOOL FOR MACHINING A WORKPIECE

(71) Applicant: Hartmetall-Werkzeugfabrik Paul Horn GmbH, Tuebingen (DE)

(72) Inventor: Christian Stark, Rottenburg-Hemmendorf (DE)

(73) Assignee: Hartmetall-Werkzeugfabrik Paul Horn GmbH, Tuebingen (DE)

( * ) Notice: Subject to any disclaimer, the term of this patent is extended or adjusted under 35 U.S.C. 154(b) by 260 days.

(21) Appl. No.: 14/643,923

(22) Filed: Mar. 10, 2015

(65) Prior Publication Data

US 2015/0183032 A1     Jul. 2, 2015

Related U.S. Application Data

(63) Continuation of application No. PCT/EP2013/068089, filed on Sep. 2, 2013.

(30) Foreign Application Priority Data

Sep. 18, 2012 (DE) .................. 10 2012 108 752

(51) Int. Cl.
    *B23C 5/20*          (2006.01)
    *B23C 5/10*          (2006.01)

(52) U.S. Cl.
    CPC ...... *B23C 5/109* (2013.01); *B23B 2200/3681* (2013.01); *B23C 2200/0433* (2013.01);
(Continued)

(58) Field of Classification Search
    CPC ...... B23C 2200/367; B23C 2200/0433; B23C 5/109; B23B 2200/3681
See application file for complete search history.

(56) References Cited

U.S. PATENT DOCUMENTS 4,294,566 A * 10/1981 Boone ................. B23B 27/1622
                                         407/104
4,790,693 A     12/1988 Koblesky
(Continued)

FOREIGN PATENT DOCUMENTS

DE          1602795        4/1970
DE      102007022536       11/2008
(Continued)

OTHER PUBLICATIONS

International Search Report for corresponding International Application No. PCT/EP2013/068089, mailed Dec. 16, 2013.
(Continued)

*Primary Examiner* — Sara Addisu
(74) *Attorney, Agent, or Firm* — Jason H. Vick; Sheridan Ross, PC

(57) ABSTRACT

A cutting insert for a tool for machining a workpiece, wherein the cutting insert has a 180° rotational symmetry about a bore axis extending perpendicularly and centrally through two opposing, identical base surfaces of the cutting insert, and has two identical parts which are connected along a center plane, wherein said center plane extends orthogonally to the bore axis and has the same distance from each of the two base surfaces, wherein each part has two identical mutually opposite main sides and two identical mutually opposite secondary sides, wherein each main side has a rectilinear main cutting edge extending parallel to the center plane, and each secondary side has a planar bearing surface extending orthogonally to the center plane, wherein the two main cutting edges of each part extend parallel to one another and transversely to the two main cutting edges of the respective other part, and wherein the two main cutting edges of each part extend parallel to the two bearing surfaces of the respective other part, wherein each main cutting edge transitions at its respective first end into a first segmental
(Continued)

cutting edge which is arranged on a first protrusion provided on an adjacent secondary side of the respective part, and wherein each main cutting edge transitions into a second segmental cutting edge at its respective second end, opposite the first end, which is arranged on a second protrusion provided on the respective other adjacent secondary side of the respective part, wherein the first and the second protrusions each adjoin the bearing surface arranged on the respective same secondary side and project with respect to the respective bearing surface.

15 Claims, 6 Drawing Sheets

(52) U.S. Cl.
CPC ... *B23C 2200/367* (2013.01); *Y10T 407/1936* (2015.01); *Y10T 407/23* (2015.01)

(56) References Cited

U.S. PATENT DOCUMENTS

| | | | |
|---|---|---|---|
| 6,238,146 B1* | 5/2001 | Satran | B23B 27/1614 407/113 |
| 6,929,427 B2* | 8/2005 | Satran | B23C 5/109 407/113 |
| 7,553,112 B1 | 6/2009 | Hecht et al. | |
| 7,591,614 B2* | 9/2009 | Craig | B23C 5/109 407/113 |
| 7,976,250 B2* | 7/2011 | Fang | B23C 5/109 407/113 |
| 8,454,278 B2* | 6/2013 | Hartlohner | B23B 27/1618 407/113 |
| 8,740,510 B2* | 6/2014 | Ishida | B23C 5/06 407/113 |
| 8,998,542 B2* | 4/2015 | Ishi | B23C 5/109 407/113 |
| 9,427,812 B2* | 8/2016 | Gesell | B23C 5/207 |
| 2004/0013478 A1* | 1/2004 | Dehn | B23C 5/22 407/113 |
| 2005/0214080 A1* | 9/2005 | Satran | B23C 5/109 407/113 |
| 2006/0045636 A1 | 3/2006 | Johnson et al. | |
| 2006/0104736 A1 | 5/2006 | Satran et al. | |
| 2007/0031201 A1* | 2/2007 | Maeda | B23C 5/109 407/34 |
| 2009/0155004 A1* | 6/2009 | Jansson | B23C 5/06 407/40 |
| 2009/0285646 A1* | 11/2009 | Oprasic | B23C 5/06 407/114 |
| 2010/0119313 A1* | 5/2010 | Hartlohner | B23B 27/1618 407/103 |
| 2010/0129166 A1 | 5/2010 | Hartlohner et al. | |
| 2010/0158620 A1* | 6/2010 | Spitzenberger | B23C 5/006 407/40 |
| 2011/0052337 A1* | 3/2011 | Dudzinsky | B23C 5/006 407/40 |
| 2011/0164932 A1* | 7/2011 | Choi | B23C 5/06 407/40 |
| 2011/0299946 A1* | 12/2011 | Hecht | B23C 5/207 407/42 |
| 2012/0076596 A1* | 3/2012 | Kim | B23C 5/1027 407/69 |
| 2012/0195700 A1* | 8/2012 | Chen | B23C 5/06 407/40 |
| 2013/0129432 A1* | 5/2013 | Jaeger | B23C 5/207 407/42 |
| 2013/0156515 A1* | 6/2013 | Satran | B23C 5/207 407/48 |
| 2013/0195566 A1* | 8/2013 | Bhagath | B23C 5/207 407/33 |
| 2013/0302099 A1* | 11/2013 | Choi | B23C 5/08 407/113 |
| 2014/0064864 A1* | 3/2014 | Kaufmann | B23B 27/141 407/114 |
| 2014/0298967 A1* | 10/2014 | Ishi | B23C 5/109 83/13 |
| 2015/0183032 A1* | 7/2015 | Stark | B23C 5/109 407/48 |
| 2015/0183034 A1* | 7/2015 | Stark | B23C 5/109 407/48 |
| 2015/0202698 A1* | 7/2015 | Morrison | B23C 5/2472 407/36 |
| 2015/0306687 A1* | 10/2015 | Choi | B23C 5/2213 407/33 |
| 2015/0328688 A1* | 11/2015 | Johansson | B23B 27/143 407/11 |
| 2015/0328689 A1* | 11/2015 | Wernh | B23B 27/145 407/103 |

FOREIGN PATENT DOCUMENTS

| | | |
|---|---|---|
| EP | 0278389 | 8/1998 |
| EP | 1572407 B1 | 1/2007 |
| JP | 2008229744 | 10/2008 |

OTHER PUBLICATIONS

International Preliminary Report on Patentability for corresponding International Application No. PCT/EP2013/068089, mailed Apr. 2, 2015.

* cited by examiner

CUTTING INSERT AND TOOL FOR MACHINING A WORKPIECE

CROSS REFERENCES TO RELATED APPLICATIONS

This application is a continuation of international patent application PCT/EP2013/068089, filed on Sep. 2, 2013 designating the U.S., which international patent application has been published in German language and claims priority from German patent application DE 10 2012 108 752.0, filed on Sep. 18, 2012. The entire contents of these priority applications are incorporated herein by reference.

BACKGROUND OF THE INVENTION

This disclosure relates to a cutting insert, in particular a tangential cutting insert, for a tool for machining a workpiece. Furthermore, the disclosure relates to a tool for machining a workpiece, in particular for tangential milling, having a tool holder which has at least one cutting-insert receptacle in which a cutting insert according to the present disclosure is releasably fastened.

Cutting inserts of the present type, which are generally denoted indexable cutting inserts or in particular as tangential cutting inserts, are usually used in applications for metalworking, in particular in milling or turning applications. Primarily, the present cutting inserts are used for tangential milling. Milling tools in which such cutting inserts are used typically comprise a rotationally symmetrical tool holder on the circumference of which at least one, but usually a multiplicity of said cutting inserts are releasably fastened.

The removal of material from the workpiece during the milling operation is ensured by high-precision blade edges or cutting edges which are formed in the cutting inserts. In order to keep the wear as low as possible, to withstand the very high cutting forces that arise during processing and to ensure precision that is as high as possible, these cutting inserts are usually produced from carbide. Nevertheless, on account of the high material stress, the cutting edges become worn over time. Therefore, in particular for milling operations which require high precision, the cutting inserts have to be replaced after a particular period of time.

In order to prevent the relatively expensive cutting inserts from having to be replaced in their entirety each time the cutting edges become worn, multisided cutting inserts which have a plurality of cutting edges that are arranged in a symmetrical manner with respect to one another have been developed. Such an indexable cutting insert having four identical main cutting edges that are arranged in a symmetrical manner with respect to one another is known for example from EP 1 572 407 B1.

The indexable cutting insert shown therein is formed so as to be rotationally symmetrical through 180° with regard to each of its three main axes. As soon as the used main cutting edge becomes worn, the indexable cutting insert can therefore be rotated and/or reversed through 180° and be fastened in the new position in the tool holder. In the event of wear to one of the four main cutting edges, the indexable cutting insert thus does not have to be replaced in its entirety but only rotated or reversed in the holder, and so machining can be continued with the previously unused, unworn main cutting edges.

On account of the symmetry properties of the indexable cutting insert, in which each main cutting edge has the same cutting edge geometry, the cutting properties are not changed by reversing or rotating the indexable cutting insert. In other words, one and the same indexable cutting insert can thus be used four times until all of the cutting edges become worn and the indexable cutting insert has to be disposed of.

In contrast to simple, non-reversible cutting inserts, such indexable cutting inserts afford much greater flexibility and, since they are usable repeatedly, can be used for much longer without this being associated with losses in terms of machining accuracy. Although such four-edged indexable cutting inserts are much more complex to produce than conventional, single-edged (non-reversible) cutting inserts, they prove to be not only more versatile but also, when considered as a whole, more cost-effective for the consumer.

However, from the point of view of the manufacturer of such indexable cutting inserts, the problem in structural terms is not only that of realizing the symmetry properties of such indexable cutting inserts with a plurality of identical cutting edges, but at the same time also ensuring that each of these cutting edges has the same machining properties and as a result is usable in an identical manner. The greatest problem is in this case often that of avoiding possible collisions with other components of the cutting insert or of the tool holder, and of ensuring secure seating of the cutting insert in the tool receptacle of the tool holder, so that optimal force introduction is ensured.

In particular, care must be taken to ensure that the cutting edges that are not being used at the particular time or other components of the cutting insert do not collide in an undesired manner with the workpiece. Thus, collisions with the workpiece must not occur at locations on the cutting insert which are not intended to be used for machining the workpiece at the particular time. In other words, care must thus be taken to ensure that the cutting edges that are not being used at the particular time run free. It stands to reason that such requirements are more difficult to meet in the case of indexable cutting inserts having a plurality of alternately usable cutting edges than is the case for conventional cutting inserts having only one cutting edge.

The abovementioned symmetry properties, the free running of the remaining cutting edges and the avoidance of undesired collisions of the cutting insert with the workpiece is solved in the case of the indexable cutting insert known from EP 1 572 407 B1 in that the indexable cutting insert has two parts which are twisted through a predefined angle with respect to one another about a main axis of the indexable cutting insert. The main cutting edges are in this case each twisted through a predefined angle with respect to one another. In this way, the required symmetry and free-running properties can be ensured in a technically sustainable manner. On the other hand, in the case of such an indexable cutting insert that is twisted on itself, a relatively large number of surfaces of complex shape arise. Such twisting results, in particular at the main insert surfaces, in relatively complex rake faces which are technically very demanding to manufacture. Demanding manufacture of this type, even if this should be technically feasible, is associated with very high manufacturing costs. Ultimately, this results in high unit costs of the indexable cutting inserts for the final consumer.

SUMMARY OF THE INVENTION

It is thus an object to provide a cutting insert of the type mentioned at the beginning which provides an alternative to the abovementioned indexable cutting inserts known from the prior art and in particular is easier to produce.

In view of this object, a cutting insert is provided which comprises:

two identical parts, wherein each part has a base surface, two identical mutually opposite main sides and two identical mutually opposite secondary sides, and wherein the base surface of the one of the two parts is opposite and parallel to the base surface of the other one of the two parts;

four rectilinear main cutting edges, wherein each of the two parts comprises two of the four rectilinear main cutting edges;

four first segmental cutting edges, wherein each of the two parts comprises two of the four first segmental cutting edges;

four second segmental cutting edges, wherein each of the two parts comprises two of the four second segmental cutting edges;

a through-bore having a bore axis which extends perpendicularly and centrally through the two base surfaces;

wherein the cutting insert has a 180° rotational symmetry about the bore axis, wherein the two identical parts are connected to each other along a center plane which extends orthogonally to the bore axis and has the same distance from each of the two base surfaces, wherein the four main cutting edges extend parallel to the center plane, wherein each main side comprises one of the four main cutting edges, wherein the two main cutting edges of each part extend parallel to one another and transversely to the two main cutting edges of the respective other part, and wherein each main cutting edge transitions at its respective first end into one of the four first segmental cutting edges and at its respective second end, opposite the first end, into one of the four second segmental cutting edges, wherein each secondary side comprises (i) a planar bearing surface which extends orthogonally to the center plane, (ii) a first protrusion on a first side of the planar bearing surface and (iii) a second protrusion on a second side of the planar bearing surface, wherein the first and the second protrusions each adjoin the bearing surface arranged on the respective same secondary side and project with respect to said bearing surface, wherein each of the first segmental cutting edges is arranged on one of the first protrusions and each of the second segmental cutting edges is arranged on one of the second protrusions, and wherein the bearing surfaces of each part extend parallel to the main cutting edges of the respective other part.

According to a further aspect, a cutting insert is provided, wherein the cutting insert has a 180° rotational symmetry about a bore axis extending perpendicularly and centrally through two opposing, identical base surfaces of the cutting insert, and has two identical parts which are connected along a center plane, wherein said center plane extends orthogonally to the bore axis and has the same distance from each of the two base surfaces, wherein each part has two identical mutually opposite main sides and two identical mutually opposite secondary sides, wherein each main side has a rectilinear main cutting edge extending parallel to the center plane, and each secondary side has a planar bearing surface extending orthogonally to the center plane, wherein the two main cutting edges of each part extend parallel to one another and transversely to the two main cutting edges of the respective other part, and wherein the two main cutting edges of each part extend parallel to the two bearing surfaces of the respective other part, wherein each main cutting edge transitions at its respective first end into a first segmental cutting edge which is arranged on a first protrusion provided on an adjacent secondary side of the respective part, and wherein each main cutting edge transitions into a second segmental cutting edge at its respective second end, opposite the first end, which is arranged on a second protrusion provided on the respective other adjacent secondary side of the respective part, wherein the first and the second protrusions each adjoin the bearing surface arranged on the respective same secondary side and project with respect to the respective bearing surface.

The presented cutting insert is a completely novel four-edged cutting insert which, compared with the cutting inserts known from the prior art, is advantageous not only from a manufacturing point of view but also on account of improved cutting properties. Although the presented cutting insert, in a similar manner to the cutting insert known from EP 1 572 407 B1, has two identical parts that are joined together and is likewise rotationally symmetrical through 180° about a bore axis extending centrally through the cutting insert, nevertheless, the presented cutting insert cannot be compared with the cutting insert known from EP 1 572 407 B1 either from a structural point of view or from a geometrical and manufacturing point of view. Both the cutting geometry and the bearing surfaces which are provided on the cutting insert and with which the cutting insert bears against the tool holder are configured in a completely different manner in the cutting insert according to the present disclosure. In contrast to the cutting insert known from EP 1 572 407 B1, the cutting insert according to this disclosure is also not configured so as to be 180° rotationally symmetrical about all of its main axes but only about the central bore axis. All four identical, rectilinear main cutting edges (blade edges) that are provided on the cutting insert are nevertheless usable in an identical manner without the machining or cutting properties changing when a change is made from one cutting edge to the other cutting edge.

At this point it should be noted that, within the meaning of the present disclosure, "180° rotationally symmetrical" means that the cutting insert is mapped onto itself when rotated through 180° about the bore axis. Furthermore, it should be mentioned that the "parts" defined herein are not intended to be understood as separate components of the cutting insert that are separable from one another, but are only intended to signify that the cutting insert consists of two bodies that are constructed in a geometrically identical manner and together form the cutting insert. These two parts are connected together integrally along the center plane in the present case.

Each of these parts has one of the two base surfaces that extend parallel to one another and is spatially delimited on the spatial sides extending transversely thereto by in each case two opposing main sides and two secondary sides that are arranged transversely thereto and are likewise opposite one another. Main and secondary sides thus each designate two opposite spatial sides of the respective part, which, together with the base surface, delimit the surface of each part.

Each of these two main sides per part or a total of four main sides of the cutting insert have a main cutting edge which is arranged thereon, extends in a rectilinear and parallel manner to the center plane and the ends of which are each adjoined by a first and a second segmental cutting edge. The expressions "first segmental cutting edge" and "second segmental cutting edge" should be understood in each case only as designations for different segmental cutting edges of the cutting insert, that is to say not as a numerical limitation. Accordingly, the cutting insert has as a whole not only four main cutting edges but also four first segmental cutting edges and four second segmental cutting edges. The first and second segmental cutting edges are in the present case only kept apart on account of the geometrical and size differences between one another. The first and second segmental cutting edges are arranged at the eight spatially external corners of the cutting insert. According to a refinement, the first and second segmental cutting edges are each configured as a corner radius or bevel. Since the workpiece can be machined with these corner radii or corner bevels as well, these are designated first and second segmental cutting edges in the present case.

An essential feature of the herein presented cutting insert can be seen in the fact that the mentioned first and second segmental cutting edges are arranged at the first and second protrusions provided on each secondary side of each part. The designations "first protrusions" and "second protrusions" should in this case in turn be regarded merely as the names or definitions for protrusions that are each the same shape or the same size, or as distinguishing terms for two different types of protrusions, namely first and second protrusions, which are arranged on the secondary sides of each part in the region of the corners of the cutting insert. In the present case, in each case one first protrusion and in each case one second protrusion adjoin the end of the planar bearing surface arranged on the same secondary side, and project with respect thereto. The first and second protrusions are thus understood as being material protrusions or material elevations which are arranged on the secondary sides of each part, respectively, and project laterally with respect to the adjoining bearing surfaces.

In the present case, these protrusions are used such that clearance angles, which are intended to ensure the necessary free-running properties of the cutting insert, are produced on the secondary cutting edges. In other words, the clearance angles which are necessary for the free-running properties of the cutting insert that are required during machining, are thus formed in the first and second protrusions. This occurs essentially in that each protrusion has surfaces that are planar and/or of complex shape and are inclined with respect to the adjacent bearing surfaces and with respect to the adjacent secondary cutting edges, such that in each case a plurality of clearance angles are produced in the corners of the cutting insert. On account of the arrangement or formation of the clearance angles in these first and second protrusions, the cutting insert does not have to be excessively twisted on itself in order to effectively avoid a collision with those components of the cutting insert that are not used during machining. Otherwise, surfaces of much less complex shape arise as a result on the outer shell of the cutting insert, as is the case for example in the cutting insert known from EP 1 572 407 B1. This makes in particular the manufacture of the cutting insert easier and thus more cost-effective.

As a result of the first and second protrusions which are provided on the secondary sides of each part and in which the clearance angles are integrated, success has been had in preserving the symmetry properties of the cutting insert and nevertheless ensuring the free-running properties. The tangential cutting insert can thus be used in four different positions in the tool holder such that the four main cutting edges are usable one after another without the cutting or geometrical properties changing in the process.

A further central feature of the herein presented cutting insert is based on the fact that the two main cutting edges of each part extend parallel to the two bearing surfaces of the in each case other part. This not only has a favorable effect on the symmetry properties of the cutting insert but also makes it possible to fix the cutting insert securely and in a mechanically stable position in a cutting insert receptacle, provided for this purpose, on the tool holder. Such bearing surfaces are frequently not configured parallel to the main cutting edges or cutting edges in the case of the cutting inserts known from the prior art. This increases in particular the complexity of the insert seat and this in turn has a negative effect on manufacturing and to some extent even has a negative effect on the cutting or chip properties that ultimately arise during machining.

At this point it should be noted that the "center plane" used for the geometrical description of the cutting insert is an imaginary auxiliary plane which is not actually physically present.

Preferably, the cutting insert is substantially rhomboidal when viewed in plan view along the bore axis. Preferably, in particular the two identical, mutually opposite base surfaces of the cutting insert are each configured in a planar manner and are substantially rhomboidal.

A "rhomboid" is understood to be a parallelogram which has four sides. The opposite sides of this parallelogram are in this case parallel and of equal length, wherein none of the four corners forms a right angle. However, the sum of all the corner angles is 360°. Such a rhomboid has two diagonals which have different lengths and intersect one another obliquely, that is to say not at right angles. A rhomboid thus differs from an equilateral rhombus.

However, it should be noted that the cutting insert is not exactly rhomboidal in the described plan view. In particular, it differs at least partially from the ideal shape of a rhomboid in the corners of the cutting insert. This is essentially on account of the first and second protrusions, already mentioned above, which project at the corners of the cutting insert. The base surfaces, which are preferably planar, also differ slightly from the shape of a rhomboid. They are thus only substantially rhomboidal.

The rhomboidal shape of the cutting insert having the first and second protrusions, which define the clearance angles, arranged thereon, has the advantage that in this way the required free-running and symmetry properties can be realized in a favorable manner. As a result of the substantially rhomboidal shape of the cutting insert, relatively few surfaces of complex shape, which are difficult to manufacture, arise. The four main insert sides of the cutting insert can thus be identical. Similarly, only few inclined or convex surfaces have to be ground into the cutting insert, thereby considerably lowering the machining outlay during manufacturing.

According to a further refinement, one of the two-parts may be mapped onto the respective other part by rotation through 180° about a rotation axis located in the center plane followed by rotation through a main cutting edge angle about the bore axis, wherein the described main cutting edge angle is an angle which the main cutting edges of one part enclose with the main cutting edges of the in each case other part.

Thus, the two parts are not mirror-inverted with regard to the center plane. Rather, the two parts are geometrically and structurally identical parts-bodies which are in contact with one another along the center plane. The abovementioned coincidence relationship is intended merely to describe the spatial orientation thereof with respect to one another.

Overall, a cutting insert, the body of which has two opposite identical base surfaces and is delimited by four identical main insert surfaces that extend between said base surfaces, is produced. Each of these main insert surfaces has in each case a secondary side of the one part and a main side (including main cutting edge) of the other part. Opposite main insert surfaces have in each case main cutting edges of the same part, whereas in the case of adjacent main insert surfaces, the main cutting edge is arranged once at the lower rim and once at the upper rim of the main insert surface.

According to a further refinement, the first protrusions are configured in a larger manner than the second protrusions. By contrast, both the first and second segmental cutting edges, that is to say the corner radii or bevels, and the adjoining secondary cutting edges are preferably configured to be the same size.

The reason for this resides in the free-running properties to be maintained, that is to say in order to avoid collisions. Depending on the milling application, it is thus possible, using the cutting insert according to this refinement, to cut via both corners (via both segmental cutting edges), or, in the case of tangential slot milling tools, in which a plurality of cutting inserts are axially offset with respect to one another, the in each case protruding corner, on which the first segmental cutting edge is arranged (additionally brought about by the larger first clearance angle), does not press in an undesired manner against the workpiece. This reduces flank wear.

According to a refinement, each first protrusion has in each case a first flank which adjoins a first secondary cutting edge and creates a first clearance angle at the respective first secondary cutting edge. Each second protrusion accordingly has a second flank which adjoins a second secondary cutting edge and creates a second clearance angle at the respective second secondary cutting edge. The first secondary cutting edges in each case adjoin the first segmental cutting edges. The second secondary cutting edges in each case adjoin the second segmental cutting edges. Preferably, the first flank is configured in a larger manner than the second flank and the first clearance angle in a larger manner than the second clearance angle. However, it goes without saying that the surface area of the first flank is only minimally larger than the surface area of the second flank.

The reasons for this reside once again in the required symmetry properties and the free-running properties, which necessarily have to be realized, during the use of the cutting insert for machining.

The first and second clearance angles each prevent the remaining cutting edges, not used during machining, or the corners of the cutting insert from colliding with the workpiece. The first and second clearance angles may be each in the range from 1° to 10°, preferably in the range from 1° to 5°.

On account of the cutting edge geometry selected for the cutting insert , when a workpiece is machined, what is referred to as a positive cut is produced. The expression positive cut is used when chip removal takes place via the rake face in the direction away from the decreasing material (counter to the slot wall that arises during machining). In contrast to the oppositely extending negative cut, such a positive cut is advantageous in terms of the chip-formation properties.

According to a further refinement, all four main cutting edges of the cutting insert are each at a first distance from the bore axis and all four bearing surfaces of the cutting insert are each at a second distance from the bore axis, wherein the first distance is smaller than the second distance.

It goes without saying that the term "distance" is intended to be understood as meaning the perpendicular distance from the bore axis. The bearing surfaces of a part thus project toward the front with respect to the main cutting edges of the in each case other part; they are thus further away from the bore axis than the main cutting edges. Expressed the other way round, the main cutting edges are offset further toward the inside, in the direction of the central bore axis, with respect to the bearing surfaces.

It is furthermore preferred for the main cutting edges to be at a smaller distance from the center plane than the base surfaces. The two main cutting edges of each part are in this case each located in a common main cutting edge plane (imaginary auxiliary plane) which extends parallel to the center plane. As a result of this height offset between the base surfaces and the two main cutting edges of the respective part, in each case a substantially planar main flank, which is inclined with respect to the respective main cutting edge plane, arises between the main cutting edges of each part and the base surface of the same part.

This planar main flank is in turn necessary to ensure the required free-running properties of the cutting insert, since otherwise the base surfaces of the cutting insert could collide with the workpiece during machining. The inclination angle which the main flanks enclose with the adjoining base surface is preferably in the region of 5°.

Furthermore, the cutting insert preferably has a through-bore which extends orthogonally to the base surfaces and breaks through the latter. This through-bore serves substantially for fastening the cutting insert in the tool holder. To this end, preferably a fastening means, in particular a screw, is passed through this through-bore and fastened to the tool holder.

Since the present disclosure relates not only to the cutting insert itself but also to the tool in which this cutting insert is used, the following is mentioned finally in this regard: the cutting insert used in the cutting-insert receptacle of the tool holder is, according to the present disclosure, arranged in a manner twisted through a defined cutting edge twist angle about a radial direction of the tool holder such that the main cutting edge used for machining encloses this cutting edge twist angle with a plane which is defined by the radial direction and a rotation axis of the tool holder. The main cutting edge used for machining is thus, in other words, arranged in a manner rotated slightly with respect to the machining or rotation direction of the milling tool. As a result, the cutting edge twist angle, which is also referred to as an axial angle on account of its arrangement, is produced.

The rotation of the indexable cutting insert or of the cutting insert within the tool holder has essentially the purpose of avoiding collisions with the non-used cutting edges and also collisions with the above-described first and second protrusions.

At this point, it should be noted that the use of the presented cutting insert is described primarily using the example of a tangential slot milling tool. However, in principle, the presented cutting insert can likewise also be used in end mills or in a turning holder. Therefore, the presented cutting insert is not limited to the application described in the present case.

The above-mentioned features and those yet to be explained in the following text are usable not only in the combination given in each case but also in other combinations or on their own, without departing from the spirit and scope of the present disclosure.

DESCRIPTION OF PREFERRED EMBODIMENTS

Figure 1:
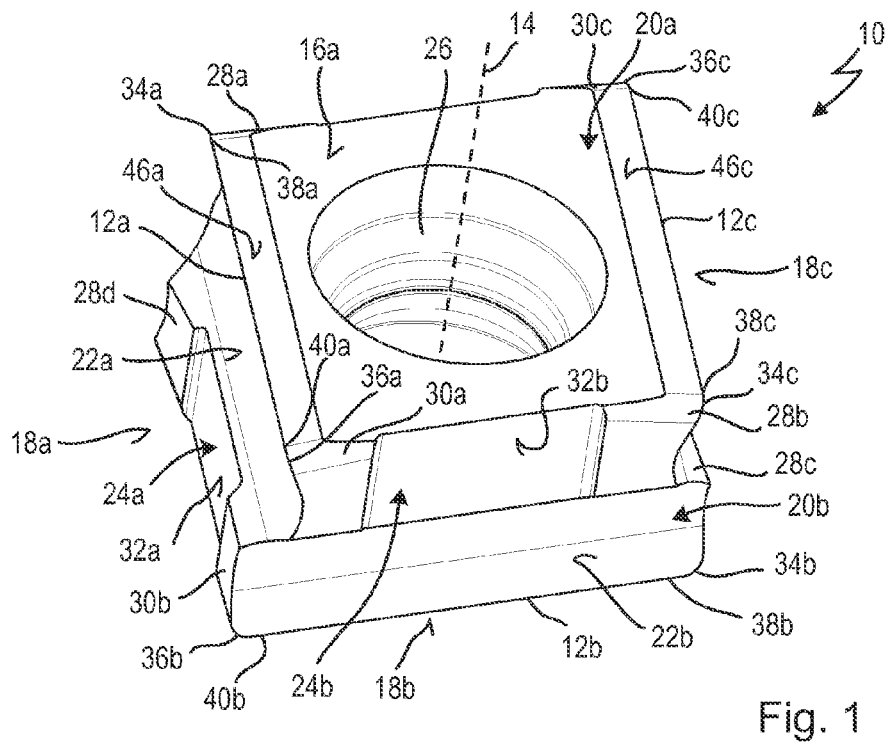
FIG. 1 shows a perspective view of a first embodiment of a cutting insert according to the present disclosure.

FIGS. 1 to 6 show an embodiment of the cutting insert in various views, wherein the cutting insert is designated as a whole by the reference sign 10. It is clear from the perspective view illustrated in FIG. 1 that it is in this case a four-edged indexable cutting insert 10 having four identical rectilinear main cutting edges 12a-d (main cutting edge 12d illustrated in a concealed manner in FIG. 1, see in this regard for example FIG. 3).

On account of its main use purpose, specifically tangential milling or tangential slot milling, this type of cutting insert 10 is also referred to as a tangential cutting insert. The external form of the cutting insert body is delimited by six sides: two end sides each comprising a planar base surface 16a, 16b that is oriented orthogonally to a bore axis 14 extending centrally through the cutting insert 10 (base surface 16b illustrated in a concealed manner in FIG. 1, see in this regard for example FIGS. 5 and 6). Furthermore, the outer side of the cutting insert body is delimited by four identical main insert sides 18a-d that extend between the base surfaces 16a, 16b. A main cutting edge 12a-d is arranged on each of these main insert sides 18a-d, respectively.

It can likewise be seen in particular from FIG. 1 that the cutting insert 10 is constructed from two identical parts 20a, b. The division into the two parts 20a, b is intended in the following text merely to simplify the description of the cutting insert 10. However, this does not mean that there are in this case two separate components. However, dividing the cutting insert 10 into two identical parts 20a, b appears to be expedient in particular on considering FIG. 1. The two parts 20a, b are connected along an imaginary center plane 11 which extends orthogonally to the bore axis 14 and is at the same distance from each of the two base surfaces 16a, b. This center plane thus divides the cutting insert 10 in an imaginary manner into two identical parts, a first part 20a and a second part 20b.

Each of these parts-bodies 20a, b has two identical mutually opposing main sides 22a-d on which the main cutting edges 12a-d are arranged, and two identical secondary sides 24a-d that extend transversely thereto and are likewise opposite one another. The main sides 22a and 22c are opposite one another and belong to the first part 20a. Likewise, the secondary sides 24b and 24d that belong to the first part 20a are located opposite one another. By contrast, the main sides 22b and 22d and the secondary sides 24a and 24c belong to the second part 20b.

Since each of the four identical main insert sides 18a-d of the cutting insert 10 comprises a main side 22a-d of one part 20a, b and a secondary side 24a-d of the other part 20a, b, a 180° rotational symmetry of the cutting insert 10 is produced overall. The main insert side 18a contains for example the main side 22a of the upper part 20a and the secondary side 24a of the lower part 20b. In the same way, the main insert side 18b contains the secondary side 24b of the upper part 20a and the main side 22b of the lower part 20b, etc.

On account of the four identical main insert sides 18a-d and the already mentioned properties of rotational symmetry through 180° of the cutting insert 10 about the bore axis 14, said cutting insert can thus be used in four different positions in the tool holder without any change occurring to the cutting geometry or the cutting properties. For example, first of all the main cutting edge 12a could be used for machining. As soon as said main cutting edge 12a becomes worn, the cutting insert 10 can be rotated through 180° about the bore axis 14 such that the main cutting edge 12c is then used. In order then to allow the two main cutting edges 12b and 12c to be used, the cutting insert merely has to be reversed about an axis located in the center plane 11 and oriented orthogonally to the bore axis 14 and be fastened in a corresponding manner to the tool holder again such that one of the main cutting edges 12b, d is oriented toward the workpiece. It goes without saying that for this purpose the cutting insert 10 has to be detached in each case from the tool holder and fastened again in its new position.

The cutting insert 10 is fastened to the work holder preferably by a fastening element, for example a screw, as is apparent from FIGS. 8 to 12, which will be dealt with in more detail below. To this end, this screw can be inserted into the through-bore 26 introduced centrally into the cutting insert 10. The through-bore 26 extends preferably exactly orthogonally to the two base surfaces 16a, b, that is to say along the bore axis 14. However, it goes without saying that other fastening possibilities are also readily conceivable, without departing from the scope of the present disclosure.

The cutting insert 10 comprises first protrusions 28a-d and second protrusions 30a-d arranged on each secondary side 24a-d of the two parts 20a, b. The first and second protrusions 28a-d and 30a-d, respectively, of each secondary side 24a-d are separated from one another in each case by a bearing surface 32a-d located in the same secondary side. The bearing surfaces 32a-d are each configured in a planar manner and extend orthogonally to the imaginary center plane 11, already mentioned above, which divides the cutting insert 10 into the two parts 20a, b. If, for example, the secondary side 24b, clearly visible in FIG. 1, of the upper part 20a is taken into consideration, said secondary side 24b has at its right-hand end, as illustrated in the drawing, a first protrusion 28b and at its left-hand end a second protrusion 30a. The bearing surface 32b extends in between. The remaining secondary sides 24a, 24c and 24d are also configured in the same way.

Both the first protrusions 28a-d and the second protrusions 30a-d project, as illustrated in the drawings, with respect to the bearing surfaces 32a-d from the respective secondary sides 24a-d. They thus form a material elevation. As is furthermore visible in FIG. 1, the abovementioned symmetry properties of the cutting insert 10 are retained on account of the alternate arrangement of the first and second protrusions 28a-d and 30a-d, respectively, in the end-side corners of the cutting insert 10.

The first and second protrusions 28a-d and 30a-d, respectively, create first and second segmental cutting edges 34a-d and 36a-d, respectively, which adjoin in each case the end of the rectilinear main cutting edges 12a-d. Each main cutting edge 12a-d thus transitions into a first segmental cutting edge 34a-d at its respective first end 38a-d and into a second segmental cutting edge 36a-d at its second end 40a-d. This is explained in more detail again in the present case by way of an example which is visible in particular in the top left-hand part of FIG. 1: the main cutting edge 12a transitions into the first segmental cutting edge 34a for example at its first end 38a. This first segmental cutting edge 34a is arranged on the first protrusion 28a. At the opposite end 40a the main cutting edge 12a transitions into the second segmental cutting edge 36a, which is arranged on the second protrusion 30a. The first and second segmental cutting edges 34a-d and 36a-d, respectively, are in each case configured either as corner radii or bevels. Since the workpiece can also be machined with these corner radii or corner bevels, these are designated first and second segmental cutting edges 34a-d and 36a-d, respectively, in the present case.

The two different types of protrusion 28a-d and 30a-d, respectively, preferably differ in shape and size. The two different types of part-cutting edges 34a-d and 36a-d are, by contrast, preferably configured to be the same size.

Preferably, the first protrusions 28a-d are configured to be larger than the second protrusions 30a-d. The different configuration in terms of geometry or size of the protrusions 28a-d and 30a-d, respectively, serves essentially to ensure the free-running properties, which are relatively difficult to ensure on account of the complexity of the cutting insert structure, for the components and cutting edges that are not used during the particular machining operation, and thus to avoid collisions. In other words, the clearance angles that are necessary for the free-running properties of the cutting insert 10 during machining are formed directly in the first and second protrusions 28a-d, 30a-d. In the case of the cutting inserts of this type that are known from the prior art, these clearance angles are usually ensured by a relatively large twist of the cutting insert 10 on itself or by a cutting geometry of complex configuration. However, introducing the clearance angle, as proposed, into such nose-like protrusions 28a-d, 30a-d that project at the corners of the cutting insert 10 can have advantages from a manufacturing point of view. Otherwise, the cutting insert 10 has also proved to be advantageous with regard to machining and chip-forming properties.

Figure 2:
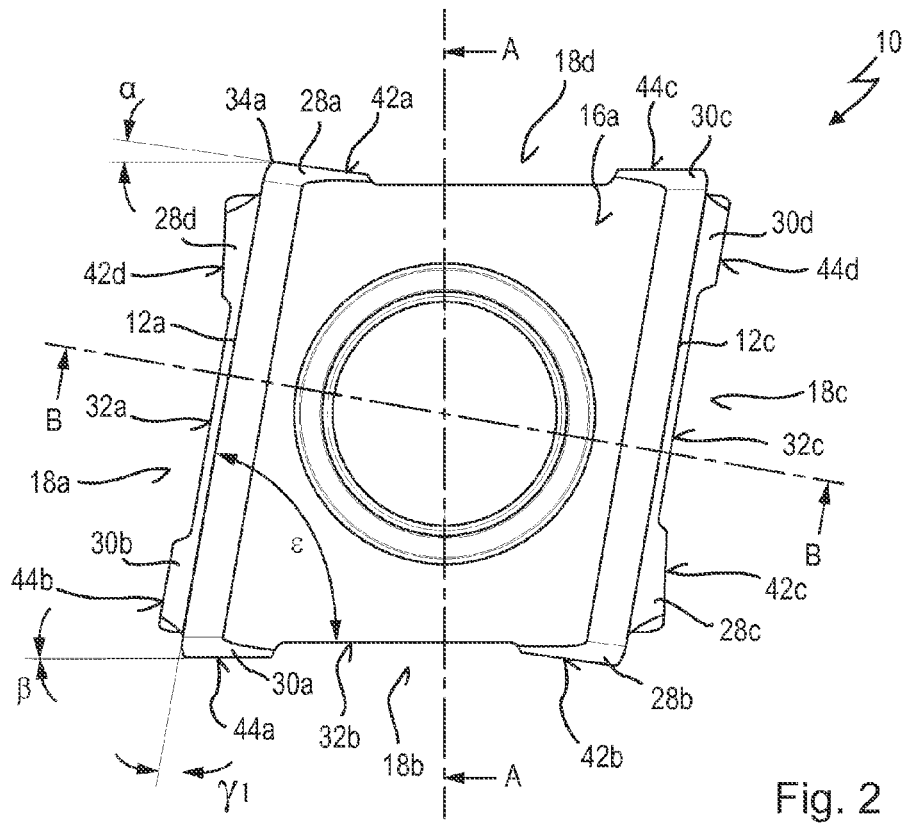
FIG. 2 shows a plan view of the first embodiment of the cutting insert from above.
Figure 3:
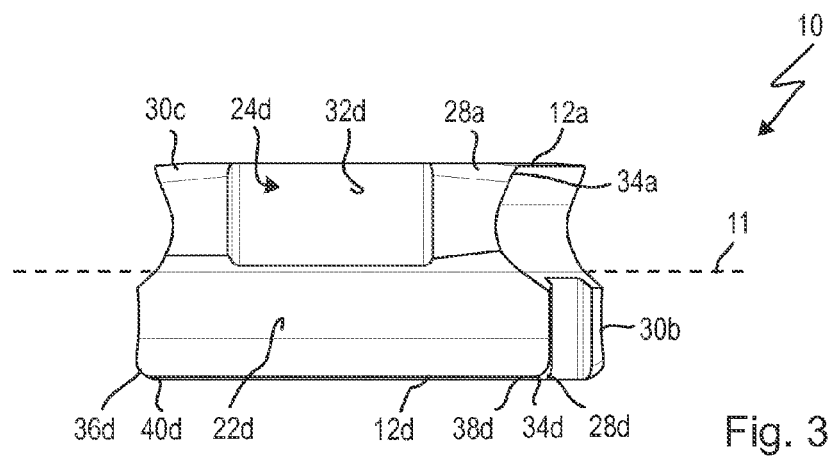
FIG. 3 shows a plan view of the first embodiment of the cutting insert from the front.

As is apparent for example from the view illustrated in FIG. 2, the clearance angles created in the corners of the cutting insert 10 are realized by first and second flanks 42a-d and 44a-d, respectively, provided on the first and second protrusions 28a-d and 30a-d, respectively. These first flanks 42a-d are arranged in each case on the first protrusions 28a-d. The second flanks 44a-d, by contrast, are arranged on the second protrusions 30a-d.

A first clearance angle produced at the first flanks 42a-d is designated angle a in FIG. 2. FIG. 2 likewise shows a second clearance angle β produced at the second flanks 44a-d. In FIG. 2, the second clearance angle β is illustrated only schematically, however, since, according to the embodiment illustrated here, it has a size of 0°. However, other angle sizes are also conceivable in principle. Preferably, both the first clearance angle a and the second clearance angle β are selected to be in the range from 0 to 10°, in particular in the range from 0 to 5°.

Figure 11:
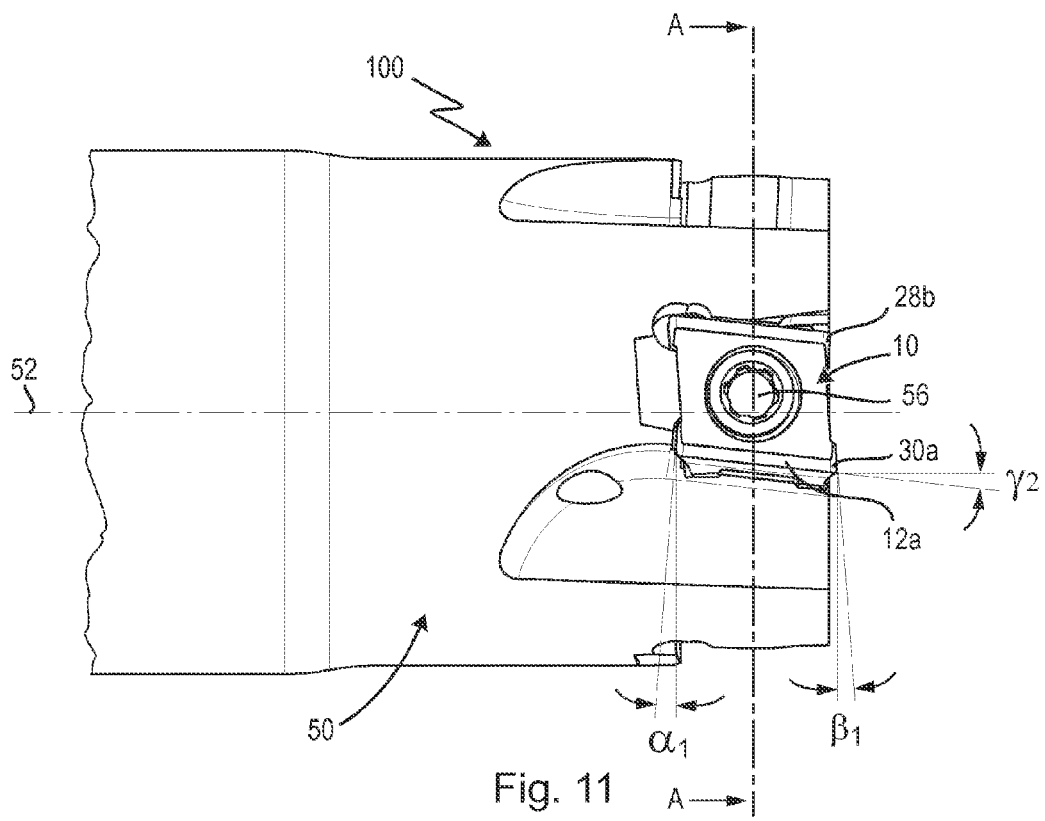
FIG. 11 shows a further lateral plan view of the tool holder with an inserted cutting insert.

In order to ensure the free-running properties, it is particularly preferred for the first clearance angle α to be larger than the second clearance angle β. It goes without saying that these clearance angles α, β change anyway, depending on the orientation of the cutting insert 10 in the tool holder. In the case of a cutting insert that is arranged in the tool holder in a slightly twisted manner at an axial angle $\gamma_2$, as is illustrated by way of example in FIG. 11, the size of the two radial clearance angles α and β changes anyway such that the angle $\alpha_1$ indicated in FIG. 11 is smaller than the angle α illustrated in FIG. 2 and the angle $\beta_1$ illustrated in FIG. 11 is larger than the angle β illustrated in FIG. 2.

Figure 10:
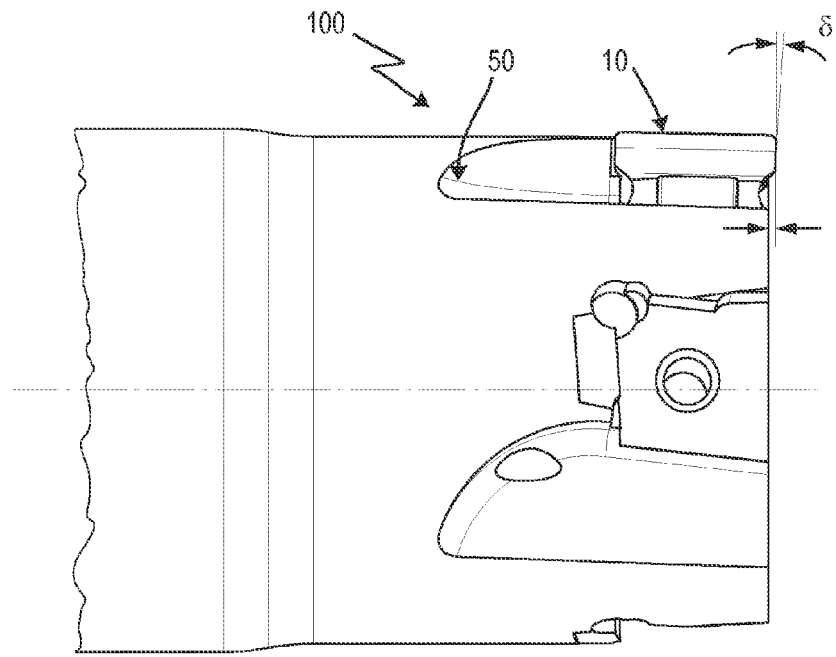
FIG. 10 shows a lateral plan view of the tool holder with an inserted cutting insert.

Otherwise, the first and second flanks 42a-d and 44a-d, respectively, are also inclined with respect to the bore axis 14 (and thus are not parallel thereto), with the result that in particular the further clearance angle δ illustrated in FIG. 10 is produced. Thus, undesired collisions with the remaining components of the cutting insert 10 do not occur either in the axial or in the radial direction.

As is apparent in particular from the plan view illustrated in FIG. 2, the cutting insert 10 is substantially rhomboidal in plan view. In particular, the end-side base surfaces 16a, b of each part 20a, b are rhomboidal. It goes without saying that neither the cutting insert 10 as a whole nor the base surfaces 16a, b correspond exactly to a rhomboid, but are substantially similar to this shape. In addition to the parallel properties of opposite sides, substantially the characteristic feature of a rhomboid is met in the present case, namely that adjacent sides enclose an angle of ≠90° with one another. As is apparent from FIG. 2, for example the main cutting edge 12a encloses an angle ε of less than 90° with the bearing surface 32b. Preferably, this angle ε is in the region of 80°.

A further central feature of the cutting insert 10 is that the main cutting edges 12a-d of the one part 20a, b extend parallel to the bearing surfaces 32a-d of the in each case other part 20a, b. As can be gathered for example from FIG. 2, the main cutting edge 12a of the part 20a extends parallel to the bearing surface 32a of the part 20b. In the same way, the main cutting edge 12c of the part 20a also extends parallel to the bearing surface 32c of the part 20b. It can additionally be gathered both from FIG. 2 and from FIG. 5 that the main cutting edges 12a-d are offset toward the inside, in the direction of the central bore axis 14, with respect to the bearing surfaces 32a-d. Thus, in other words, the bearing surfaces 32a-c are at a greater distance from the bore axis 14 than the main cutting edges 12a-c.

Figure 4:
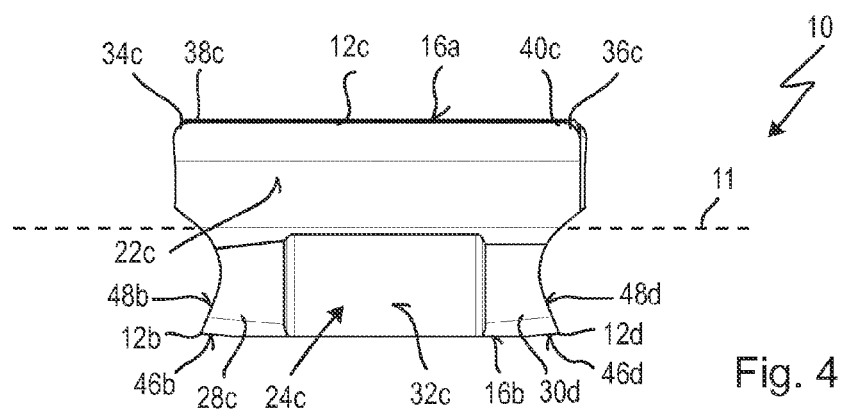
FIG. 4 shows a further plan view of the first embodiment of the cutting insert from the side.
Figure 5:
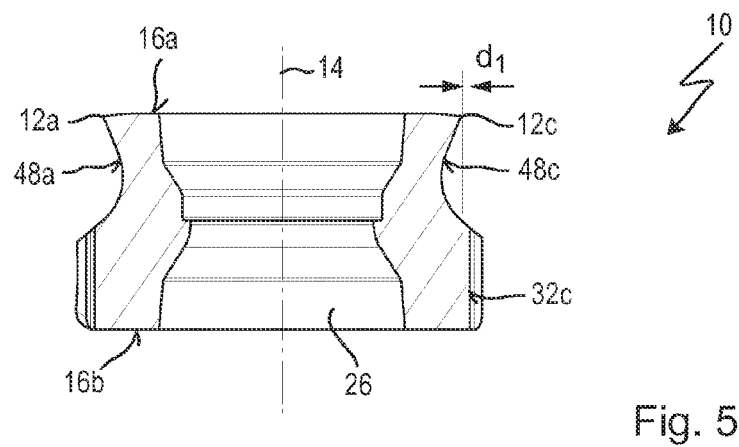
FIG. 5 shows a sectional view of the first embodiment of the cutting insert (section B-B)
Figure 6:
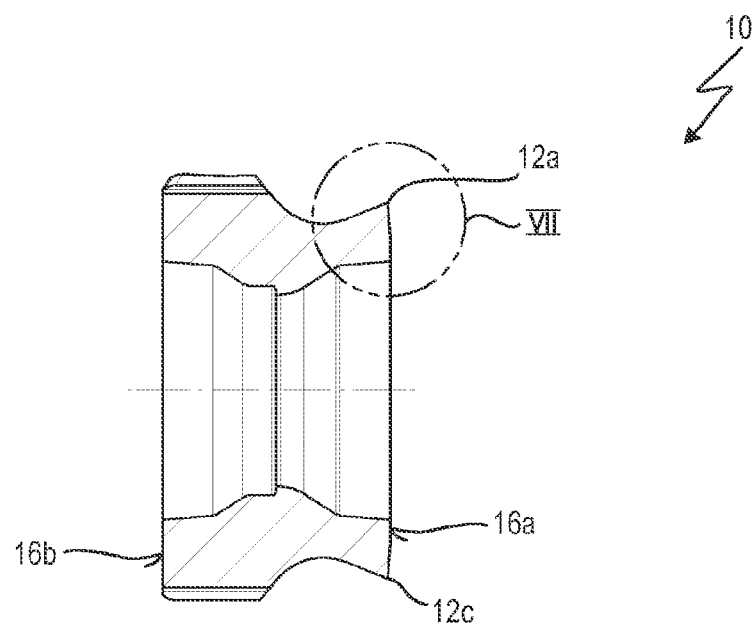
FIG. 6 shows a further sectional view of the first embodiment of the cutting insert (section A-A)

Furthermore, the main cutting edges 12a-d are also slightly vertically off-set with respect to the base surfaces 16a, b (see for example FIG. 4). Specifically, the distance of the main cutting edges 12a-d from the center plane 11 is smaller than the distance of the base surfaces 16a, b from this center plane 11. On account of this vertical offset, main flanks 46a, d are therefore produced in each case between the main cutting edges 12a-d and the base surfaces 16a, b of the same part 20a, b.

Figure 7:
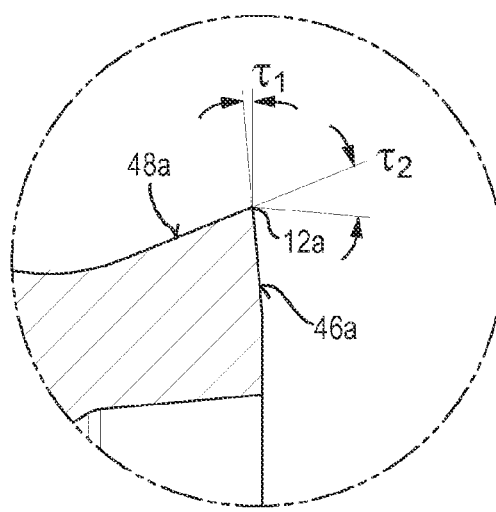
FIG. 7 shows a detail view from FIG. 6.

FIG. 7 illustrates in an enlarged manner the respective clearance angle $\tau_1$ produced by the main flanks 46a-d using the example of the main flank 46a. This angle may be in the range from 0.5 to 10°, in particular in the region of 5° or exactly 5°. Furthermore, it can be gathered from the enlarged view illustrated in FIG. 7 that in each case a rake face 48a-d, via which the chip produced during machining can run off, adjoins each main cutting edge 12a-d on the associated main side 18a-d. By way of these rake faces 48a-d that are inclined relative to the bore axis 14, preferably a rake angle $\tau_2$ in the range from 0 to 40°, preferably in the range from 15° to 25°, or in particular of exactly 22°, is produced.

FIGS. 8 to 12 show by way of example a tool, in which the cutting insert 10 is typically used. The tool is designated as a whole by the reference sign 100 in these figures.

The tool illustrated by way of example is illustrated in this case as a typical tangential milling tool 100. This tangential milling tool 100 has a tool holder 50 which is configured so as to be rotationally symmetrical about a rotation axis 52. At least one, preferably a multiplicity of cutting insert receptacles 54 (illustrated in detail in FIG. 8), which act as a receptacle for in each case one cutting insert 10, are provided on the circumference of the tool holder 50. In FIGS. 9 to 12, by way of example in each case one cutting insert 10 is inserted. This cutting insert 10 is preferably fastened releasably to the tool holder 50 by way of a screw 56.

Figure 8:
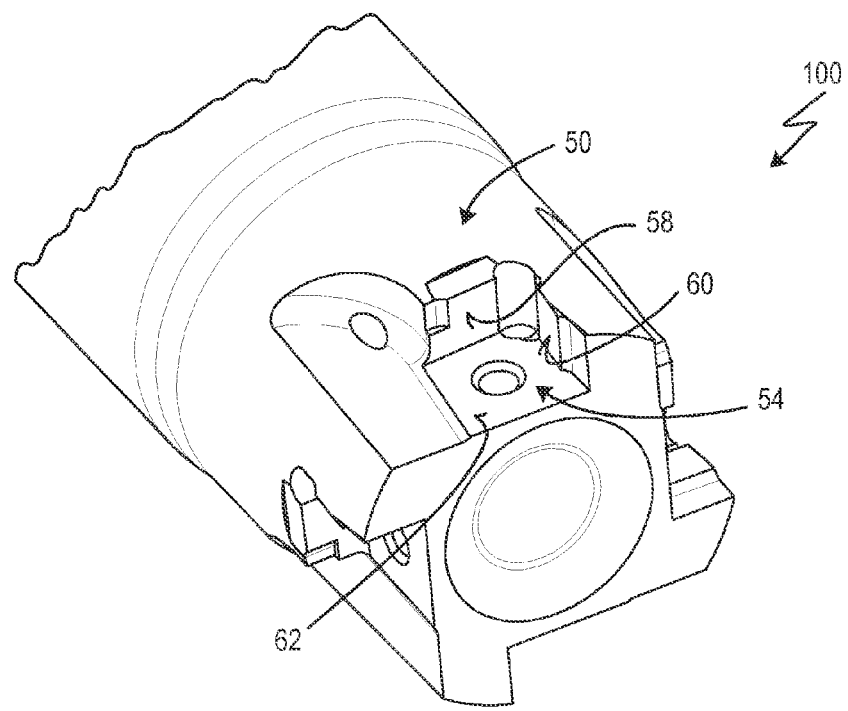
FIG. 8 shows a perspective view of a tool holder without the cutting insert inserted therein.
Figure 9:
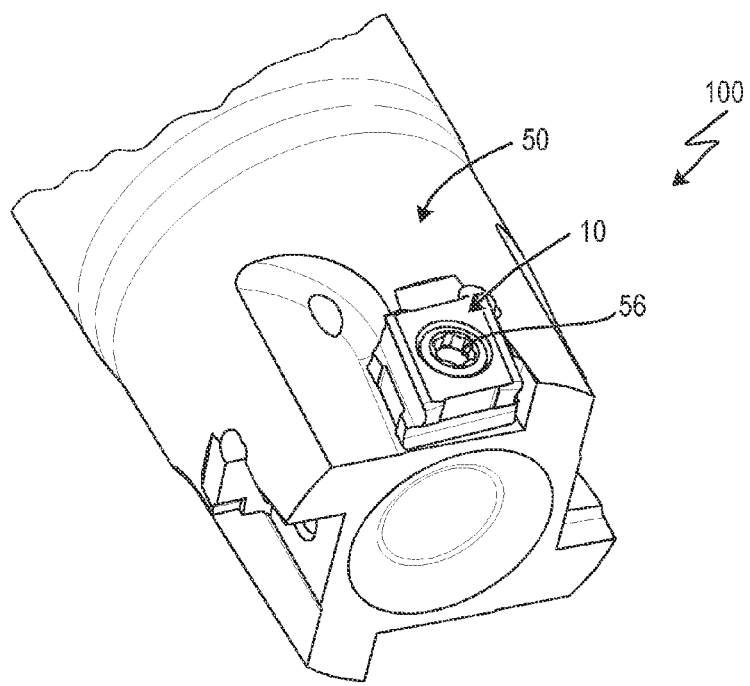
FIG. 9 shows a perspective view of the tool holder with the cutting insert inserted therein.

The structural details of the cutting insert receptacle 54 are apparent from FIG. 8. The cutting insert receptacle 54 has in each case bearing surfaces 58 and 60 at which the cutting insert 10 rests against the tool holder 50 by way of its bearing surfaces 32a-d. A further base surface 62 arranged in the base of the cutting insert receptacle 54 serves as a bearing surface against which the cutting insert 10 rests by way of one of its end-side base surfaces 16a, b. The bearing surfaces 58 and 60 are preferably configured orthogonally to the base surface 62. In this way, a mechanically stable and clearly defined insert seat is realized.

FIG. 11 illustrates once again the arrangement of the cutting insert 10 within the tool holder 50. It is apparent therefrom that the cutting insert 10 is arranged in the tool holder 50 in a manner twisted through an angle $\gamma_2$ about its bore axis. This angle $\gamma_2$ is also designated axial angle. More specifically, this is the angle which the main cutting edge 12a used for machining encloses with the axial direction of the tool holder 50. On account of the angle E and the small twist angle in the axial direction $\gamma_1$ (see for example FIG. 2), a (relatively) large axial angle $\gamma_2$ ($\gamma_1 < \gamma_2$) is produced. A large axial angle $y_2$ is desired in this design in order to achieve a cut that is as positive (smooth) as possible. The contour deviation (deviation of the cutting contour produced on the workpiece from the cutting edge contour of the cutting insert) is not in the foreground in this type of cutting insert, but should not be too large.

It is also apparent from FIG. 10 that a further clearance angle δ, which guarantees radial free running, is produced by the flanks 44a-d formed in the protrusions 30a-d.

Figure 12:
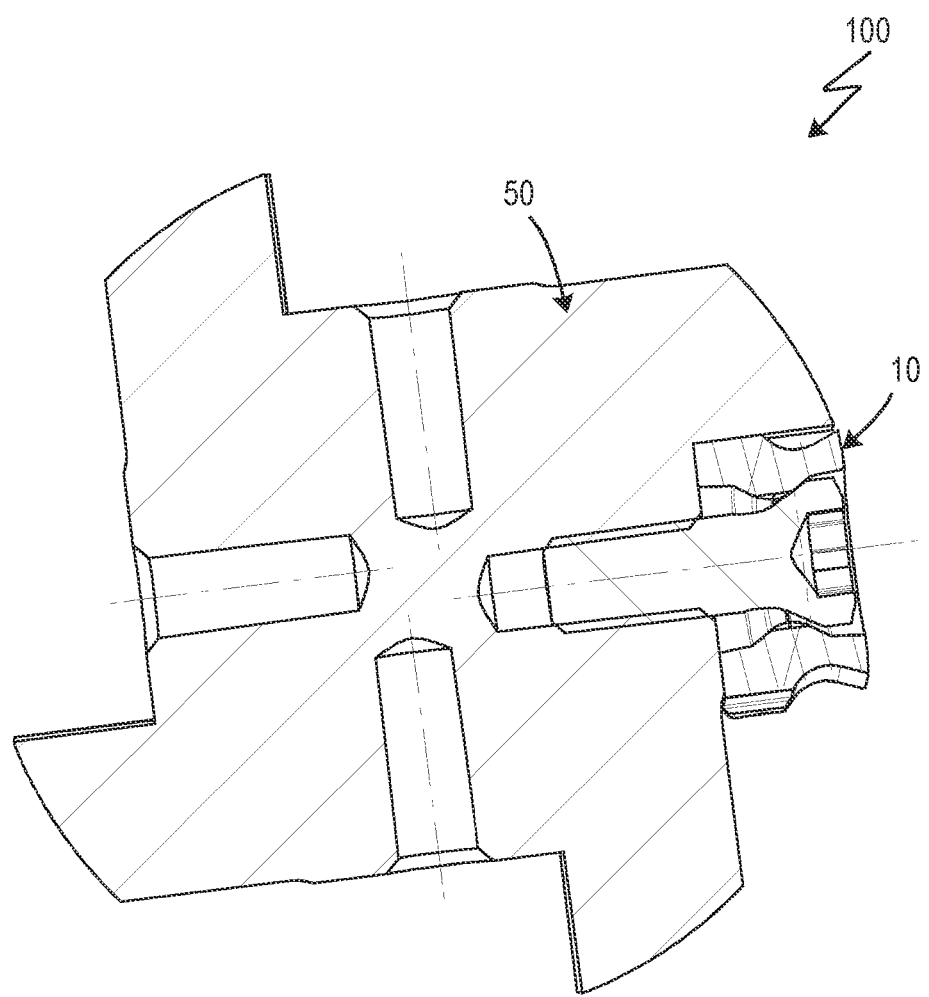
FIG. 12 shows a sectional view of the tool holder with an inserted cutting insert.

For the sake of completeness, it should also be mentioned that FIG. 12 illustrates the section A-A indicated in FIG. 11.

In summary, it can thus be stated that the inventors have succeeded in providing an alternative four-edged tangential cutting insert which, on account of its relatively simply configured cutting edge geometry, is easy and cost-effective to manufacture and nevertheless has high machining accuracy. The clearance angles that are required for free-running properties are formed by what are referred to as "noses" which are designated protrusions in the present case. As a result, it is possible to machine the workpiece even with the cutting-edge corners without undesired collisions.

What is claimed is:

1. A cutting insert for a tool for machining a workpiece, comprising:
   two identical parts, wherein each part has a base surface, two identical mutually opposite main sides and two identical mutually opposite secondary sides, and wherein the base surface of the one of the two parts is opposite and parallel to the base surface of the other one of the two parts;
   four rectilinear main cutting edges, wherein each of the two parts comprises two of the four rectilinear main cutting edges;
   four first segmental cutting edges, wherein each of the two parts comprises two of the four first segmental cutting edges;
   four second segmental cutting edges, wherein each of the two parts comprises two of the four second segmental cutting edges;
   a through-bore having a bore axis which extends perpendicularly and centrally through the two base surfaces;
   wherein the cutting insert has a 180° rotational symmetry about the bore axis, wherein the two identical parts are connected to each other along a center plane which extends orthogonally to the bore axis and has the same distance from each of the two base surfaces,
   wherein the four main cutting edges extend parallel to the center plane, wherein each main side comprises one of the four main cutting edges, wherein the two main cutting edges of each part extend parallel to one another and transversely to the two main cutting edges of the respective other part, and wherein each main cutting edge transitions at its respective first end into one of the four first segmental cutting edges and at its respective second end, opposite the first end, into one of the four second segmental cutting edges,
   wherein each secondary side comprises (i) a planar bearing surface which extends orthogonally to the center plane, (ii) a first protrusion on a first side of the planar bearing surface and (iii) a second protrusion on a second side of the planar bearing surface, wherein the first and the second protrusions each adjoin the bearing surface arranged on the respective same secondary side and project with respect to said bearing surface, wherein each of the first segmental cutting edges is arranged on one of the first protrusions and each of the second segmental cutting edges is arranged on one of the second protrusions, and wherein the bearing surfaces of each part extend parallel to the main cutting edges of the respective other part.

2. The cutting insert as claimed in claim 1, wherein the cutting insert has exactly four identical main cutting edges.

3. The cutting insert as claimed in claim 1, wherein the cutting insert is substantially rhomboidal when viewed in plan view along the bore axis.

4. The cutting insert as claimed in claim 1, wherein the two identical, mutually opposite base surfaces of the cutting insert are each planar and substantially rhomboidal.

5. The cutting insert as claimed in claim 1, wherein one of the two parts of the cutting insert may be mapped onto the respective other part of the cutting insert (i) by rotation through 180° about a rotation axis located in the center plane followed (ii) by rotation through a main cutting edge angle about the bore axis, wherein the main cutting edge angle is an angle which the main cutting edges of one part enclose with the main cutting edges of the respective other part.

6. The cutting insert as claimed in claim 1, wherein the first protrusions are larger than the second protrusions.

7. The cutting insert as claimed in claim 1, wherein each of the first protrusions has a first flank which adjoins a first secondary cutting edge and creates a first clearance angle at the respective first secondary cutting edge.

8. The cutting insert as claimed in claim 1, wherein each of the second protrusions has a second flank which adjoins a second secondary cutting edge and creates a second clearance angle at the respective second secondary cutting edge.

9. The cutting insert as claimed in claim 1, wherein each of the first protrusions has a first flank which adjoins a first secondary cutting edge and creates a first clearance angle at the respective first secondary cutting edge, wherein each of the second protrusions has a second flank which adjoins a second secondary cutting edge and creates a second clearance angle at the respective second secondary cutting edge, wherein the first flank is larger than the second flank, and wherein the first clearance angle is larger than the second clearance angle.

10. The cutting insert as claimed in claim 1, wherein the main cutting edges are each at a first distance from the bore axis and the bearing surfaces of the cutting insert are each at a second distance from the bore axis, and wherein the first distance is smaller than the second distance.

11. The cutting insert as claimed in claim 1, wherein the main cutting edges are at a smaller distance from the center plane than the base surfaces.

12. The cutting insert as claimed in claim 1, wherein the main cutting edges of each part are located in a respective common main cutting edge plane which extends parallel to the center plane, and wherein a substantially planar main flank is provided locally in between each of the two main cutting edges of each part and the base surface of the same part, respectively, each main flank being inclined with respect to the respective main cutting edge plane of the same part.

13. A tool for machining a workpiece, in particular for tangential milling, having a tool holder which has at least one cutting-insert receptacle in which a cutting insert is releasably fastened, the cutting insert comprising:

two identical parts, wherein each part has a base surface, two identical mutually opposite main sides and two identical mutually opposite secondary sides, and wherein the base surface of the one of the two parts is opposite and parallel to the base surface of the other one of the two parts;

four rectilinear main cutting edges, wherein each of the two parts comprises two of the four rectilinear main cutting edges;

four first segmental cutting edges, wherein each of the two parts comprises two of the four first segmental cutting edges;

four second segmental cutting edges, wherein each of the two parts comprises two of the four second segmental cutting edges;

a through-bore having a bore axis which extends perpendicularly and centrally through the two base surfaces wherein the cutting insert has a 180° rotational symmetry about the bore axis, wherein the two identical parts are connected to each other along a center plane which extends orthogonally to the bore axis and has the same distance from each of the two base surfaces, wherein the four main cutting edges extend parallel to the center plane, wherein each main side comprises one of the four main cutting edges, wherein the two main cutting edges of each part extend parallel to one another and transversely to the two main cutting edges of the respective other part, and wherein each main cutting edge transitions at its respective first end into one of the four first segmental cutting edges and at its respective second end, opposite the first end, into one of the four second segmental cutting edges, wherein each secondary side comprises (i) a planar bearing surface which extends orthogonally to the center plane, (ii) a first protrusion on a first side of the planar bearing surface and (iii) a second protrusion on a second side of the planar bearing surface, wherein the first and the second protrusions each adjoin the bearing surface arranged on the respective same secondary side and project with respect to said bearing surface, wherein each of the first segmental cutting edges is arranged on one of the first protrusions and each of the second segmental cutting edges is arranged on one of the second protrusions, and wherein the bearing surfaces of each part extend parallel to the main cutting edges of the respective other part.

14. The tool as claimed in claim 13, wherein the tool holder is symmetrical about a rotation axis, and wherein the at least one cutting insert is arranged in the cutting-insert receptacle in a manner twisted through a defined cutting edge twist angle about a radial direction of the tool holder such that the main cutting edge used for machining encloses this cutting edge twist angle with a plane which is defined by the radial direction and the rotation axis of the tool holder.

15. A cutting insert for a tool for machining a workpiece, wherein the cutting insert has a 180° rotational symmetry about a bore axis extending perpendicularly and centrally through two opposing, identical base surfaces of the cutting insert, and has two identical parts which are connected along a center plane, wherein said center plane extends orthogonally to the bore axis and has the same distance from each of the two base surfaces, wherein each part has two identical mutually opposite main sides and two identical mutually opposite secondary sides, wherein each main side has a rectilinear main cutting edge extending parallel to the center plane, and each secondary side has a planar bearing surface extending orthogonally to the center plane, wherein the two main cutting edges of each part extend parallel to one another and transversely to the two main cutting edges of the respective other part, and wherein the two main cutting edges of each part extend parallel to the two bearing surfaces of the respective other part, wherein each main cutting edge transitions at its respective first end into a first segmental cutting edge which is arranged on a first protrusion provided on an adjacent secondary side of the respective part, and wherein each main cutting edge transitions into a second segmental cutting edge at its respective second end, opposite the first end, which is arranged on a second protrusion provided on the respective other adjacent secondary side of the respective part, wherein the first and the second protrusions each adjoin the bearing surface arranged on the respective same secondary side and project with respect to the respective bearing surface.

* * * * *